Feb. 10, 1931.  W. F. DEHUFF  1,792,363
MIXING MACHINE
Filed Dec. 11, 1928   2 Sheets-Sheet 1

Inventor
Walter F. Dehuff
By Mason Fenwick & Lawrence
Attorneys

Feb. 10, 1931.   W. F. DEHUFF   1,792,363
MIXING MACHINE
Filed Dec. 11, 1928   2 Sheets-Sheet 2
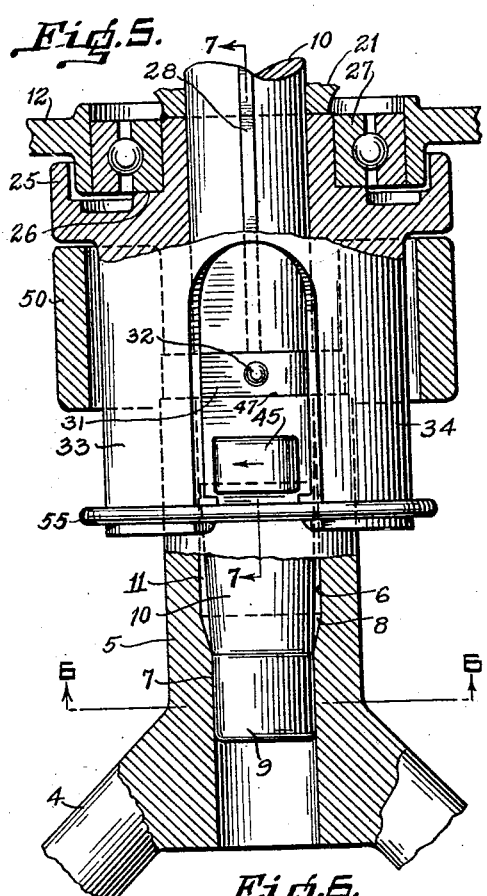
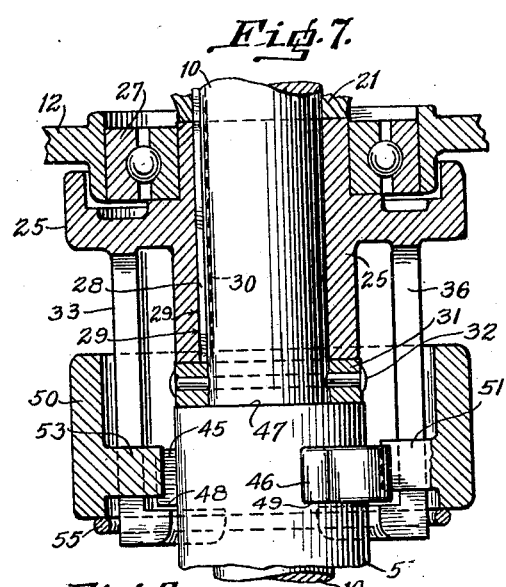
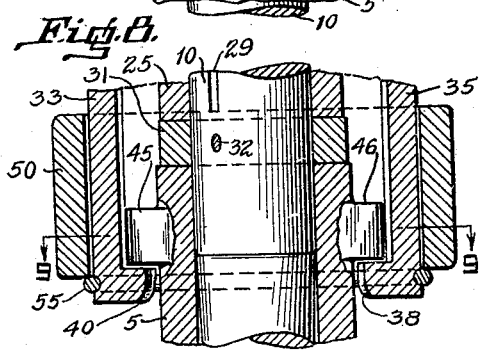
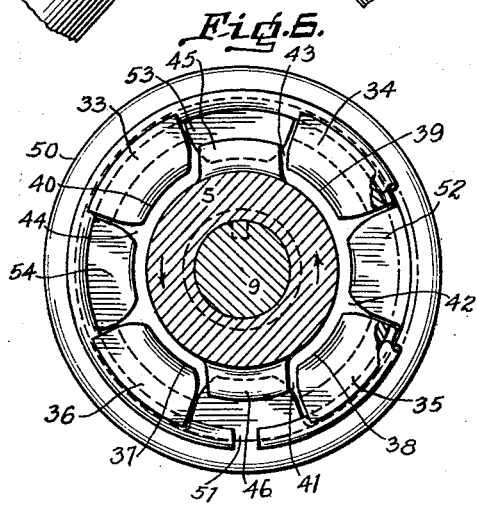
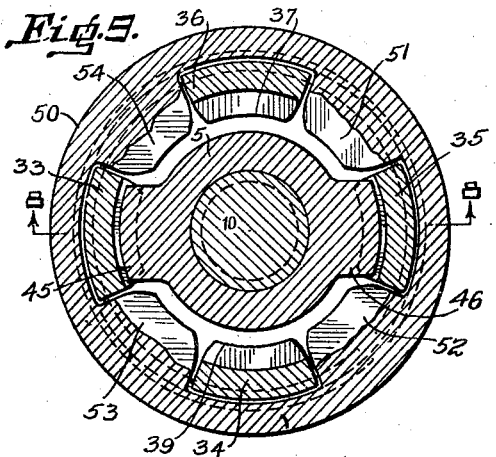
Inventor
Walter F. Dehuff
By Mason Fenwick & Lawrence
Attorneys Patented Feb. 10, 1931

1,792,363

UNITED STATES PATENT OFFICE

WALTER F. DEHUFF, OF GLEN ROCK, PENNSYLVANIA, ASSIGNOR TO GLEN MIXER COMPANY, OF GLEN ROCK, PENNSYLVANIA

MIXING MACHINE

Application filed December 11, 1928. Serial No. 325,195.

The invention forming the subject matter of this application is a power operated mixer designed particularly for mixing or beating dough in large batches.

In machines of this type, disclosed broadly in my United States Patent No. 1,656,665, the dough is beaten or mixed in large bowls of about 120-quart capacity. In prior art mixers, it was either necessary to provide some kind of detachable bolt connection between the head of the beater and the beater shaft, in order to facilitate connection between these members without raising or lowering the bowl, or to provide means for raising and lowering the bowl in cases where the beater was connected to the beater shaft by a cylindrical socket in the beater engaging the lower end of the beater shaft. In the latter case, it was always difficult and time consuming to connect the beater to the beater shaft, because the cylindrical socket at the head of the beater had to be exactly alined with the beater shaft. This operation became more difficult in case any dough remained in the bowl to offer resistance to the movements of the beater in the bowl in order to secure exact alinement between the socket in the head of the beater and the cylindrical beater shaft.

The object of the present invention is to provide cooperating means on the head of the beater and the connecting end of the beater shaft, whereby the beater can be very quickly connected to or detached from the beater shaft without the necessity of first securing alinement between the socket in the beater head and the beater shaft.

A further object of the invention is to provide machines of this type with a quick acting detachable connection between the head of the beater and the end of the beater shaft, whereby the beater can be very quickly secured to or removed from the beater shaft without the necessity of using tools of any kind to effect this connection or removal.

Other objects of the invention will be disclosed as the detailed description thereof proceeds.

In the drawings:

Figure 5 is a vertical cross sectional view, to an enlarged scale, of the joint between the beater head and beater shaft, with the locking ring of the joint in inoperative position.

Figure 6 is a horizontal section taken on line 6—6 of Figure 5;

Figure 7 is a vertical transverse section taken on the line 7—7 of Figure 5, with the locking ring in its position to lock the beater head to the beater shaft;

Figure 8 is a vertical section taken on the line 8—8 of Figure 9 and showing the beater head locked to the beater shaft; and Figure 9 is a horizontal section taken on the line 9—9 of Figure 8.

Figure 1:
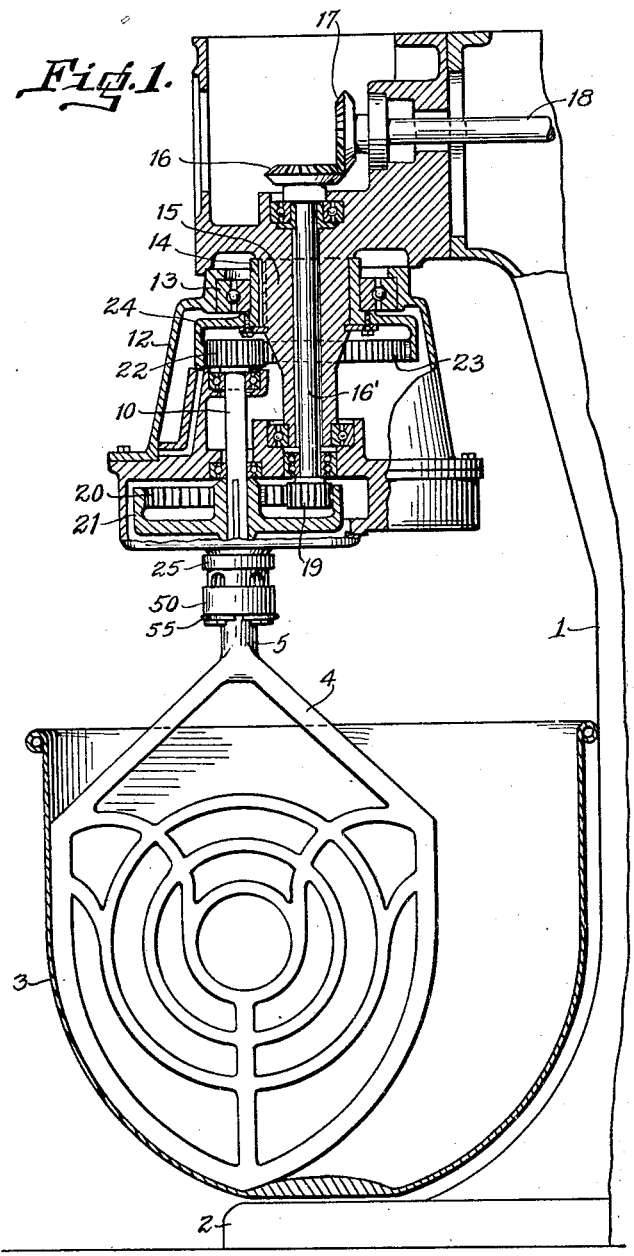
Figure 1 is a fragmentary vertical section of the invention.
Figure 2:
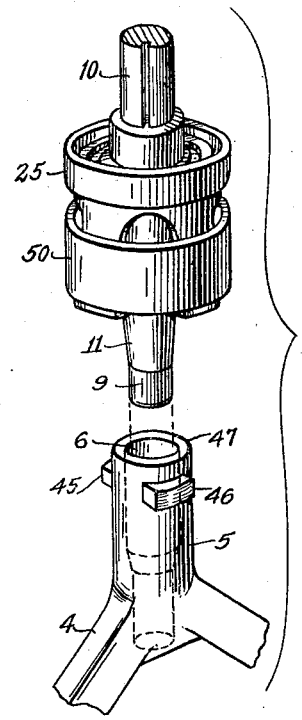
Figure 2 is an exploded perspective of the parts of the invention which provide for the attachment of the beater to the beater shaft.

Referring to the drawings:

The invention forms part of a mixer comprising a standard 1 extending upwardly from a base 2, which forms a support for a mixing bowl 3, adapted to be supported by, or secured in any suitable manner to, the base 2 in proper position for receiving the beater 4.

The beater 4 has the head 5 thereof provided with cylindrical axially alined bores 6 and 7, the bore 6 being of larger diameter than the bore 7 and adapted to slide snugly on the beater shaft 10.

The walls of bores 6 and 7 are connected to each other by the frusto-conical wall 8, which provides for easy sliding movement of lower end 9 of the shaft 10 from the bore 6 in the bore 7. The end 9 of shaft 10 fits snugly into the bore 7; and the shaft 10 fits snugly into the bore 6. A part 11 of the shaft 10 is tapered sufficiently to clear the inclined conical wall 8, so that the beater head may be firmly secured to shaft 10 by contact with two relatively spaced parts of the shaft.

The shaft 10 is rotatably mounted in a casing 12 which, in turn, is rotatably mounted by means of ball bearing 13 on an annular bracket 14 suitably secured to a bearing 15 depending from the upper end of the standard 1. A drive shaft 16' is rotatably mounted in the bearing 15 and is rotated by means of the beveled gearing 16—17, connecting the shaft 16' to the shaft 18 of a prime mover.

The lower end of the shaft 16' has a pinion 19 fixed thereto and in mesh with the teeth 20 of an internal gear 21 which is keyed on or otherwise suitably secured to the shaft. The shaft 10 has a pinion 22 fixed to its upper end and meshing with the internal gear teeth 23 of a gear ring 24 fixed to the bearing 15 and forming part of the bracket 14 which supports the ball bearing 13.

The gearing construction just described is adapted not only to rotate the shaft 10 about its own axis, but also to rotate the casing 12 and the shaft 10 along with it around the axis of the shaft 16'. This causes the beater 4 to rotate in the bowl about the axis of the shaft 10 and also to rotate around the inside of the bowl around the axis of the shaft 16. This construction is fully disclosed in my United States Patent 1,656,665, and is illustrated here particularly to disclose the quick detachable means for connecting the beater to the beater shaft.

In order to connect the beater head detachably to the lower end of the shaft 10 where it projects below the bottom of the casing 12, a sleeve 25 is keyed on to the shaft 10 and is provided with a shoulder 26 to form a seat for part of the ball bearing 27 which mounts the shaft 10 rotatably in the bottom of casing 12.

The sleeve 25 is secured against rotation on the shaft 10 by means of the key 28 mounted in slots 29 and 30 formed in the shaft 10 and in the sleeve 25 respectively. The sleeve 25 is prevented from lengthwise movement on the shaft 10 by means of a ring 31 fixed on the shaft 10 against the lower end of the sleeve 25 by a pin 32 which extends diametrically through the ring and the shaft 10.

Figure 3:
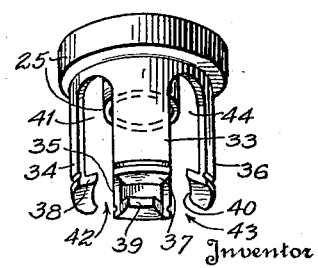
Figure 3 is a perspective view of a detail of the joint between the beater head and beater shaft.
Figure 4:
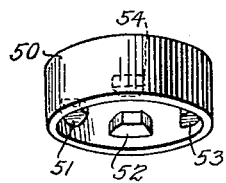
Figure 4 is a perspective view of a locking ring forming part of the joint between the beater head and beater shaft.

A series of arms 33, 34, 35 and 36 depend from the upper part of the sleeve 25 and terminate at their lower ends in inwardly projecting lugs 37, 38, 39 and 40, respectively, (see Figure 3). The arms 33, 34, 35 and 36 are equi-distantly spaced apart from each other to provide spaces 41, 42, 43 and 44 adapted to receive slidably lugs 45 and 46, formed on diametrically opposite sides of the head 5 of beater 4. Lugs 45 and 46 are spaced from the end 47 of the beater head 5 at such distance that when the end 47 contacts with the ring 31, the lower sides 48 and 49 of the lugs 45 and 46, respectively, are just clear of the upper sides of the inwardly projecting lugs formed on the arms 33, 34, 35 and 36.

It is obvious that, when the beater head 5 is positioned on the shaft 10 as shown in Figure 5, the head may be rotated in either direction to cause the lugs 45 and 46 to rest on the diametrically opposite lugs 33 and 35, or lugs 34 and 36. When the head is so rotated, the locking ring 50 may be lowered from the position shown in Figures 5 and 6 to head-locking position shown in Figures 7, 8 and 9.

The head-locking function of the ring 50 is effected by means of the lugs 51, 52, 53 and 54, which project inwardly from ring 50 and slide in the spaces 41, 42, 43 and 44, between the arms 33, 34, 35 and 36, respectively. When the ring 5 is lowered to locking position, the adjacent sides of diametrically opposite pairs of lugs 51, 52, 53 and 54 engage the sides of lugs 45 and 46 and thereby prevent rotation of the beater head relatively to the beater shaft.

In order to position the locking ring 50 properly in locking position, the lower ends of the arms 33, 34, 35 and 36, are provided with coplanar arcuate grooves, in which a split ring 55 is detachably seated. The ring 55 may be removed whenever it becomes necessary or desirable to remove the locking ring 50.

It will be obvious from the preceding disclosure that whenever it becomes necessary or desirable to attach the beater to the beater shaft, all that is necessary is to raise the locking ring 50 into the position shown in Figure 5, slide the beater head on to the beater shaft until the end 47 contacts with the stop ring 31, and then give the head slight turn to seat the lugs 45 and 46 in diametrically opposite pairs of the inwardly projecting lugs 37, 38, 39 and 40. When the lugs 45 and 46 are so seated the locking ring 50 may be dropped on to the split wire ring 55 to lock the head securely against rotation on the shaft 10.

By reversing the steps of attaching the head 5 to shaft 10, as just described, it is obvious that the beater may be readily disconnected from shaft 10. It will also be obvious that the connection or disconnection of the head 5 with the shaft 10 can be effected manually and without the aid of any tools.

What I claim is:

1. In a mixing machine, a shaft having a sleeve fixed thereto, arms depending from said sleeve and spaced apart from each other to form openings, lugs projecting inwardly toward said shaft, a head adapted to be coupled to said shaft and having locking means adapted to enter the openings formed between the arms and to be rotated into locked position with the lugs carried by said sleeve, means on said sleeve for filling the spaces formed between the arms on said sleeve after the locking means on said head have been rotated into locked position.

2. In a mixing machine, a shaft having a sleeve, arms depending from said sleeve and spaced apart from each other to form openings, lugs formed on said arms and projecting inwardly toward said shaft, a head adapted to be coupled to said shaft and having projections thereon adapted to enter the openings formed between the arms and to be rotated into contact with the lugs carried by said arms, means on said sleeve for filling the spaces formed between the arms on said sleeve and maintaining the projections and lugs in locked relationship after the projections have been rotated into contact position.

3. In a mixing machine, a shaft having a sleeve, arms depending from said sleeve and spaced apart from each other to form openings, lugs formed on said arms and projecting inwardly toward said shaft, a head adapted to be coupled to said shaft and having projections thereon adapted to enter the openings formed between the arms and to be rotated into contact with the lugs carried by said arms, means slidable on said sleeve and provided with projections for filling the spaces formed between the arms on said sleeve to maintain the head in interlocked position after the projections on said head have been rotated into locked position.

4. In a mixing machine, a shaft having a sleeve, arms depending from said sleeve and spaced apart from each other to form openings, lugs formed on said arms and projecting inwardly toward said shaft, a head adapted to be coupled to said shaft and having projections thereon adapted to enter the openings formed between the arms and to be rotated into contact with the lugs carried by said arms, a collar slidable on said sleeve and provided with projections extending into the spaces formed between the arms and adapted to be lowered into filling position after the head and sleeve are in interlocked position.

In testimony whereof I affix my signature.

WALTER F. DEHUFF.